March 31, 1942.  R. E. HORGER  2,277,980
LOCOMOTIVE ROD BEARING
Filed Aug. 19, 1941
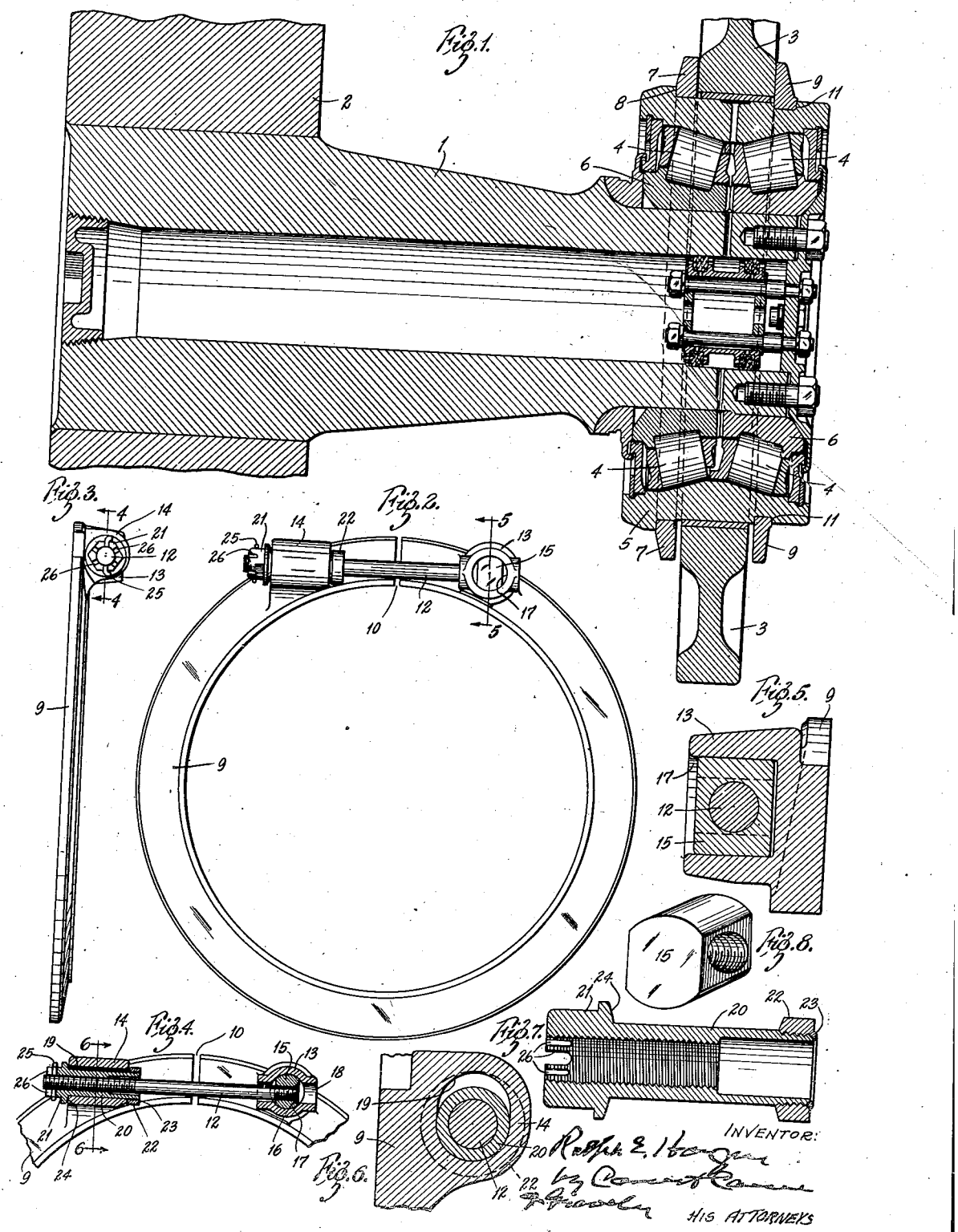
INVENTOR:
Ralph E. Horger
HIS ATTORNEYS Patented Mar. 31, 1942

2,277,980

UNITED STATES PATENT OFFICE 2,277,980

LOCOMOTIVE ROD BEARING

Ralph E. Horger, Canton, Ohio, assignor to The Timken Roller Bearing Company, Canton, Ohio, a corporation of Ohio Application April 19, 1941, Serial No. 389,315

8 Claims. (Cl. 308—161)

This invention relates generally to locomotive rod bearing constructions and more particularly to the split locking rings used in such constructions for holding the locomotive rod in place on the journal of the crank pin and for taking the side thrust of said rod. The principal object of the present invention is to provide simple and efficient, strong and durable easily operable means for mechanically expanding the split locking ring to facilitate mounting and dismounting thereof and for contracting the ring to securely lock it in place. The invention consists in the improved means for expanding and contracting the locking ring and in the parts and combinations and arrangements of parts hereinafter described and claimed.

In the accompanying drawing, which forms part of this specification and wherein like symbols refer to like parts wherever they occur:

Fig. 1 is a central longitudinal section through a locomotive rod bearing construction provided with a split locking ring embodying my invention, Fig. 2 is an outer end elevational view of the contracted locking ring, Fig. 3 is an edge view of said locking ring, Fig. 4 is a fragmentary section on the line 4—4 in Fig. 3, Fig. 5 is an enlarged cross-section on the line 5—5 in Fig. 2, Fig. 6 is a cross-section on the line 6—6 in Fig. 4, Fig. 7 is a central longitudinal section through the double headed nut for the adjusting screw of the ring expanding and contracting device; and Fig. 8 is a perspective view of the head element of said adjusting screw.

In the accompanying drawing my invention is shown embodied in a locomotive rod bearing construction comprising a crank pin or shaft 1 rigid with a driving wheel 2, a sealed rotary antifriction bearing mounted on said crank pin and a locomotive side rod 3 journaled at one end on said bearing. The rotary antifriction bearing shown in the accompanying drawing comprises two caged series of tapered bearing rollers 4 that cooperate with a common cup or outer raceway member 5, which forms the journal for the rod, and inner raceway members or cones 6 that are press-fitted on the crank pin 1. An abutment ring 7 is sleeved on the outer raceway member 5 between an external annular shoulder 8 thereon near the inner end thereof and the inner side face of the rod 3. A second or outer abutment ring 9 is sleeved on the outer end portion of the outer raceway member 5 adjacent to the outer side face of said rod 3, said ring being split radially, as at 10, and seating in an external annular groove 11 provided therefor in said outer raceway member. The two rings 7 and 9 serve as abutments to take up side thrust of the rod 3, while the outermost ring 9 serves to hold said rod in place on the outer raceway member 5, which constitutes the journal for the rod.

The split or open ring 9 is provided with means whereby it may be mechanically expanded and contracted so as to slip on and off the outer raceway member 5 and seated in and disengaged from the external annular groove 11 provided therefor in said member. This expanding and contracting means comprises a screw 12 that extends across the split 10 in the locking ring 9 at the outer end thereof. The ring 9 has outstanding bosses 13 and 14 on the outer end face thereof that are disposed one on each side of the split 10 in said ring. Said screw has a cylindrical head 15 threaded on and welded, as at 16, to one end thereof. This cylindrical head 15 is disposed crosswise of the screw 12 and is journaled in a cylindrical socket 17 provided therefor in the boss 13. The cylindrical socket 17 is disposed with its axis parallel with the axis of the locking ring 9; and the boss 13, in which said socket is formed, has a cylindrical cross bore 18 extending therethrough that intersects said socket and is disposed substantially at right angles to the split 10 in said ring. The screw 12 extends through the portion of the cross bore 18 located between the cylindrical screw head supporting socket 17 and the split in the ring, sufficient clearance being provided between said bore and screw to permit limited swinging movement of the latter transversely of the ring axis about the axis of said socket as a pivot. The boss 14 on the annular locking ring 9 is located opposite the screw head supporting boss 13 and has an opening 19 extending therethrough substantially in line with the cross bore 18 in said screw head supporting boss. The body of the screw 12 extends through the hole 19 in the boss 14 and has its free end portion threaded to receive an elongated nut or internally threaded sleeve 20, which extends through the opening in the boss and has a hexagonal wrench receiving head 21 formed integral with the outer end thereof and an annular head 22 threaded on and welded, as at 23, to the inner end thereof. The heads of the double headed nut 20 bear against the boss 14 at opposite ends of the nut receiving opening 19 therethrough, thereby preventing endwise movement of said nut in said boss. As shown in the drawing, the opening 19 through the boss 14 is made large enough to permit the nut 20 to tilt endwise therein in response to the swinging movement of the screw 12 about the axis of the cylindrical screw head supporting socket 17 in the boss 13, the hexagonal head 21 at the outer end of said nut having a ball face inner end portion 24 that bears against the outer end of the nut supporting boss or lug 14 so as to facilitate tilting movement of the nut. The nut 20 is locked in the desired position of rotary adjustment on the adjusting screw 12 preferably by means of a locking pin 25 which passes through a diametrical hole provided therefor in said screw and has its ends seated in diametrically opposed radial notches 26 in the outer end of the hexagonal head 21 at the outer end of said nut.

By the arrangement described, the locking ring 9 may be quickly and easily expanded or contracted by turning the double headed nut 20 on the screw 12, the heads of the nut preventing axial movement thereof in its supporting boss 14 and the head 15 of the screw preventing rotary movement thereof, whereby rotation of the nut causes the screw to travel therethrough and thus expand or contract the ring, depending on the direction in which the nut is rotated. When it is desired to mount the ring 9 on the outer raceway member 5, which constitutes the journal for the locomotive rod 3, the nut 20 is rotated in a direction which will cause the ring to expand an amount sufficient to permit the ring to be slipped over said raceway member and positioned over the external annular groove 11 therein. The nut 20 is then rotated in a reverse direction to contract the ring and thus cause the ring to seat tightly in the external groove 11 in the outer raceway member 5. The nut 20 is then locked against rotation by means of the wire locking pin 25. During the operation of expanding and contracting the ring, limited swinging movement of the screw 12 is permitted, due to the pivotal mounting of the head 15 of the screw in the cylindrical socket 17, thereby permitting the screw to accommodate itself to the changes in the relative positions of the two ends of the ring.

The invention is not limited to the locomotive rod bearing construction shown and described.

What I claim is:

1. A locking ring having a split therein and means for mechanically expanding and contracting said ring comprising a nut attached to said ring on one side of said split for rotary but substantially non-axial sliding movement, and a screw extending across said split with one end anchored to said ring on the other side of said split and with its other end threaded through said nut.

2. A locking ring having a split therein and means for mechanically expanding and contracting said ring comprising a nut supported on said ring on one side of said split for rotary but substantially non-axial sliding movement, and a screw extending across said split with one end pivotally secured to said ring at one side of said split for swinging movement transversely of the axis of said ring and with its other end threaded through said nut.

3. A locking ring having a split therein and means for mechanically expanding and contracting said ring comprising a nut mounted on said ring on one side of said split for rotary but substantially non-axial sliding movement, and a screw extending across said split with one end pivotally secured to said ring at one side of said split for swinging movement transversely of the axis of said ring and with its other end threaded through said nut, said nut being mounted on said ring for movement relative thereto in the direction of swinging movement of said screw.

4. A locking ring having a split therein and means for mechanically expanding and contracting said ring comprising a nut mounted on said ring on one side of said split for rotary but substantially non-axial sliding movement, a screw extending across said split with one end pivotally secured to said ring at one side of said split for limited swinging movement transversely of the axis of said ring and with its other end threaded through said nut, said nut being mounted on said ring for limited movement relative thereto in the direction of swinging movement of said screw, and means for locking said nut to said screw.

5. A locking ring having a split therein and means for mechanically expanding and contracting said ring comprising a nut mounted on said ring on one side of said split for rotary but substantially non-axial sliding movement and a screw extending across said split and having a cylindrical crosshead at one end pivotally mounted in a cylindrical socket provided therefor in said ring on the other side of said split, said socket being disposed parallel with the axis of said ring, said screw having its other end threaded through said nut.

6. A locking ring having a split therein and two outstanding bosses on an end face thereof one on each side of said split, one of said bosses having a cylindrical socket therein disposed substantially parallel with the axis of said ring, the other of said bosses having an opening extending therethrough substantially at right angles to said split, a nut extending through said opening and having heads at its ends disposed in abutting relation to the corresponding ends of said boss, and a screw having a portion journaled in the cylindrical socket of said first mentioned boss and a portion extending across said split and threaded through the nut in said other boss.

7. A locking ring having a split therein and two outstanding bosses on an end face of said ring one on each side of said split, one of said bosses having a cylindrical socket therein disposed substantially parallel with the axis of said ring and a cross bore intersecting said cylindrical socket substantially at right angles to said split, the other of said bosses having an opening extending therethrough substantially in line with said cross bore, a nut extending through said opening and having at the end remote from said split an enlarged wrench receiving head disposed in abutting relation with the corresponding end of said other boss, a head removably secured to the other end of said nut in abutting relation to the corresponding end of said other boss, a screw extending through the cross bore of said first mentioned boss and threaded into said nut, and a cylindrical head journaled in the cylindrical socket of said first mentioned boss and removably secured to said screw.

8. A locking ring having a split therein and two outstanding bosses on an end face thereof one on each side of said split, one of said bosses having a cylindrical socket therein disposed substantially parallel with the axis of said ring and a cross bore extending through said boss substantially at right angles to said split and intersecting said cylindrical socket, the other of said bosses having an opening extending therethrough substantially in line with said cross bore, a nut mounted in said opening for limited endwise tilting movement therein, and having a wrench receiving head integral with one end disposed in abutting relation to the corresponding end of said boss, a head threaded on and welded to the other end of said nut in abutting relation to the corresponding end of said boss, a screw extending through the cross bore of said first mentioned boss and threaded through said nut, a cylindrical head journaled in the cylindrical socket of said first mentioned boss and threaded on and welded to said screw, and means for locking said nut in the desired position of rotary adjustment.

RALPH E. HORGER.